(12) United States Patent
Thielman et al.

(10) Patent No.: US 7,924,305 B2
(45) Date of Patent: Apr. 12, 2011

(54) CONSISTENT QUALITY FOR MULTIPOINT VIDEOCONFERENCING SYSTEMS

(75) Inventors: Jeffrey Thielman, Corvallis, OR (US); C. Phillip Callaway, Corvallis, OR (US); Scott Grasley, Lebanon, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1244 days.

(21) Appl. No.: 11/521,766

(22) Filed: Sep. 15, 2006

(65) Prior Publication Data

US 2008/0068444 A1    Mar. 20, 2008

(51) Int. Cl.
*H04N 7/14* (2006.01)

(52) U.S. Cl. ........... 348/14.09; 348/14.08; 348/14.12; 348/14.1

(58) Field of Classification Search .... 348/14.01–14.16; 370/260–261; 715/753, 755, 751; 709/204
See application file for complete search history.

(56) References Cited

U.S. PATENT DOCUMENTS

| | | | |
|---|---|---|---|
| 5,751,337 A | 5/1998 | Allen et al. | |
| 5,794,018 A | 8/1998 | Vrvilo et al. | |
| 6,008,838 A | 12/1999 | Iizawa | |
| 6,091,447 A | 7/2000 | Gershfeld | |
| 6,380,968 B1 | 4/2002 | Alexander et al. | |
| 6,380,990 B1 | 4/2002 | Bessel | |
| 6,453,336 B1 | 9/2002 | Beyda et al. | |
| 6,614,465 B2 | 9/2003 | Alexander et al. | |
| 6,633,324 B2 | 10/2003 | Stephens, Jr. | |
| 6,654,048 B1 | 11/2003 | Barrett-Lennard et al. | |
| 6,654,825 B2 | 11/2003 | Clapp et al. | |
| 6,680,746 B2 | 1/2004 | Kawai et al. | |
| 6,693,661 B1 | 2/2004 | Vanderwilt et al. | |
| 6,853,398 B2 | 2/2005 | Malzbender et al. | |
| 6,965,399 B1 | 11/2005 | Oka et al. | |
| 6,989,856 B2 | 1/2006 | Firestone et al. | |
| 7,023,470 B2 | 4/2006 | Braun | |
| 7,089,285 B1 | 8/2006 | Drell | |
| 7,095,455 B2 | 8/2006 | Jordan et al. | |
| 2005/0073530 A1 | 4/2005 | Kapur et al. | |
| 2005/0122392 A1* | 6/2005 | Johansen et al. ........ | 348/14.09 |
| 2005/0213739 A1 | 9/2005 | Rodman et al. | |
| 2007/0115948 A1* | 5/2007 | Dasgupta et al. ........ | 370/356 |

FOREIGN PATENT DOCUMENTS

| | | |
|---|---|---|
| EP | 1564682 A | 8/2005 |
| GB | 2 332 323 A | 6/1999 |
| GB | 2351627 A | 1/2001 |

OTHER PUBLICATIONS

International Search Report and Written Opinion—PCT/US2007/078040—Hewlett-Packard Development Company—International Filing Date—Oct. 9, 2007.

* cited by examiner

*Primary Examiner* — Melur Ramakrishnaiah

(57) ABSTRACT

A technique for maintaining consistent video quality between a plurality of videoconference sites is disclosed. Calibration correction factors are determined from video calibration data obtained from the videoconference sites. The calibration factors are applied to transmissions between the videoconference sites.

18 Claims, 3 Drawing Sheets

Consistent Quality for Multipoint Videoconferencing Systems

CONSISTENT QUALITY FOR MULTIPOINT VIDEOCONFERENCING SYSTEMS

BACKGROUND

Face to face meetings are a mainstay of the business world. Face to face meetings are particularly important to coordinate activities when a project team is dispersed across multiple geographic locations. While getting meeting participants together in one room is easy when all participants are located in the same office, this is difficult when some team members must travel. The value of face to face interaction is demonstrated by the cost and inconvenience of the extensive business travel that businesses incur to facilitate face to face meetings. On one hand, dispersed teams are becoming more common with the increasing globalization of business. On the other hand, air travel is being subjected to increased security procedures causing additional inconvenience and lost productivity for business travelers. Accordingly, alternatives to travel that can obtain similar benefits as face to face meetings are increasingly being sought.

Videoconferencing offers a convenient alternative to travel. While many different videoconferencing systems have been developed, videoconferencing has so far failed to make major inroads into replacing travel as a means for facilitating face to face meetings. Perhaps the greatest reason that videoconferences have not achieved hoped for benefits is that most systems do not provide a sense of actually being present in the same room as the other parties. Among various factors that inhibit the feeling of being present with the other parties is that meetings often start with a preliminary step of adjusting and cameras, displays, and other equipment in the videoconference room to provide acceptable quality images. Even so, image quality often varies widely between different sites as a result of differences in equipment types, equipment settings, and room environments. Multipoint videoconferences multiply these difficulties, as more cameras, displays, and transmission paths are involved, increasing the number of variables.

Variations in lighting, color, setting, camera positioning and the like between images from different videoconference sites provide continuous reminders to the participants that they are watching each other on a display and not actually communicating face to face. These variations are distractions that shift the attention of videoconference participants away from each other and towards the technology being used (and the limitations of that technology). The resulting quality of interaction is reduced, and becomes a poor substitute for being physically in each other's presence.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

DETAILED DESCRIPTION OF EXAMPLE EMBODIMENTS

Figure 1:
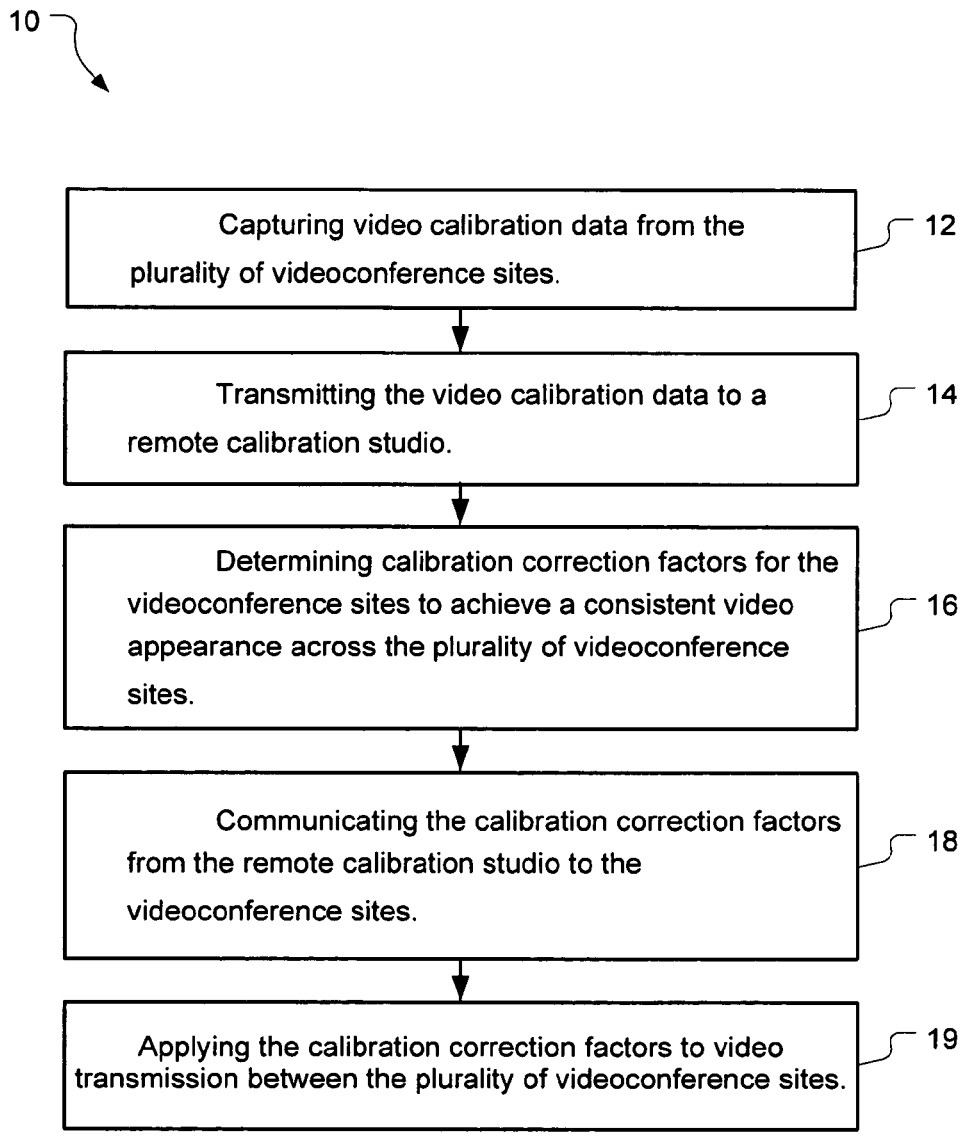
FIG. 1 is a flow chart of a method of maintaining consistent video quality between a plurality of videoconference sites in accordance with an embodiment of the present invention.

In describing embodiments of the present invention, the following terminology will be used.

The singular forms "a," "an," and "the" include plural referents unless the context clearly dictates otherwise. Thus, for example, reference to "a camera" includes reference to one or more of such cameras.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

As an illustration, a numerical range of "1 $cd/m^2$ or less" should be interpreted to include not only the explicitly recited value of about 1 $cd/m^2$, but also include individual values and sub-ranges within the indicated range. Thus, included in this numerical range are individual values such as 0.5, 0.25, and 0.1 $cd/m^2$ and sub-ranges such as from 0.25-1 $cd/m^2$, and from 0.5-0.75 $cd/m^2$.

As used herein, the term "about" means that dimensions, sizes, formulations, parameters, shapes and other quantities and characteristics are not and need not be exact, but may be approximated and/or larger or smaller, as desired, reflecting tolerances, conversion factors, rounding off, measurement error and the like and other factors known to those of skill in the art.

The term color can include variations in various setting which affect the intensity or colors of a video image. For example, measurements or adjustments of color can include black point, white point, gamma, color, color balance, and similar parameters.

Reference will now be made to the exemplary embodiments illustrated, and specific language will be used herein to describe the same. It will nevertheless be understood that no limitation of the scope of the invention is thereby intended.

A sense of presence in a common room can be enhanced for participants in a multipoint videoconference by matching displayed images to achieve a consistent appearance for each site. An end to end calibration approach, while capable of providing consistent images between two sites may fail when multiple sites are involved. For example, images taken by a camera at a first site may be displayed using different displays at a second site and a third site. Adjusting the camera at the first site to produce a good image at the second site may not result in a good image at the third site. On the other hand, adjusting a display at the second site to correct images from the first site may cause other problems. For example, adjustments to the display at the second site do not help images displayed at the third site, and may result in distortion of images being received from the third site. As more sites are added to a multipoint video conferencing system, these types of calibration issues become magnified, as there are many different possible combinations of cameras and displays that may be used.

Accordingly, one embodiment of the present invention is a method of maintaining consistent video quality between a plurality of videoconference sites. The videoconference sites can be capable of direct communication with each other in a multipoint videoconference system. By direct communication it is meant that the videoconference sites may exchange video images with each other, for example, through a public or private communication network. FIG. 1 illustrates a flow chart of the method in accordance with an embodiment of the present invention. The method, shown generally at 10, can include capturing 12 video calibration data from the plurality of videoconference sites. For example, capturing video calibration data can include imaging a video calibration target. Capturing video calibration data can include imaging a display within a videoconference site using a sensor, such as a camera or colorimeter, collocated within the videoconference site. For example, a sensor can measuring a light intensity level within the video image or within the videoconference site. The display can display a video color calibration image transmitted from a calibration studio to the display.

The method 10 can include transmitting 14 the video calibration data to a remote calibration studio. Transmission of the video calibration data may use various communications protocols and infrastructure, including for example Internet Protocol (IP) over a private network. The video calibration data is received by the remote calibration studio and used for determining 16 calibration correction factors for the videoconference sites. The calibration correction factors can be determined to achieve a consistent video appearance across the plurality of videoconference sites. For example, calibration correction factors can be determined by comparing the video images to a reference color scheme.

The method 10 can include communicating 18 the calibration correction factors from the remote calibration studio to the videoconference sites. This communication can be performed using the same communications protocols and infrastructure for transmission of video images, or may use a different technique.

The videoconference sites can receive the calibration correction factors from the calibration studio. The method can include applying 19 the calibration correction factors to video transmission between the plurality of videoconference sites. For example, applying the calibration correction factors can include adjusting the view of the camera (e.g., pan, tilt, roll, zoom, iris, focus, etc.). As another example, camera color settings can be adjusted to normalize transmitted color to a reference color scheme. As yet another example, display color settings can be adjusted to normalize displayed color to a reference color scheme. It will be appreciated that normalizing cameras and displays to the same reference color scheme throughout the multipoint videoconference system can help to provide a consistent appearance throughout the network. As another example, various settings of video processing devices can be adjusted, including, for example, scalers, video encoders and decoders, look up tables, video transmission and reception, and similar equipment.

Figure 2:
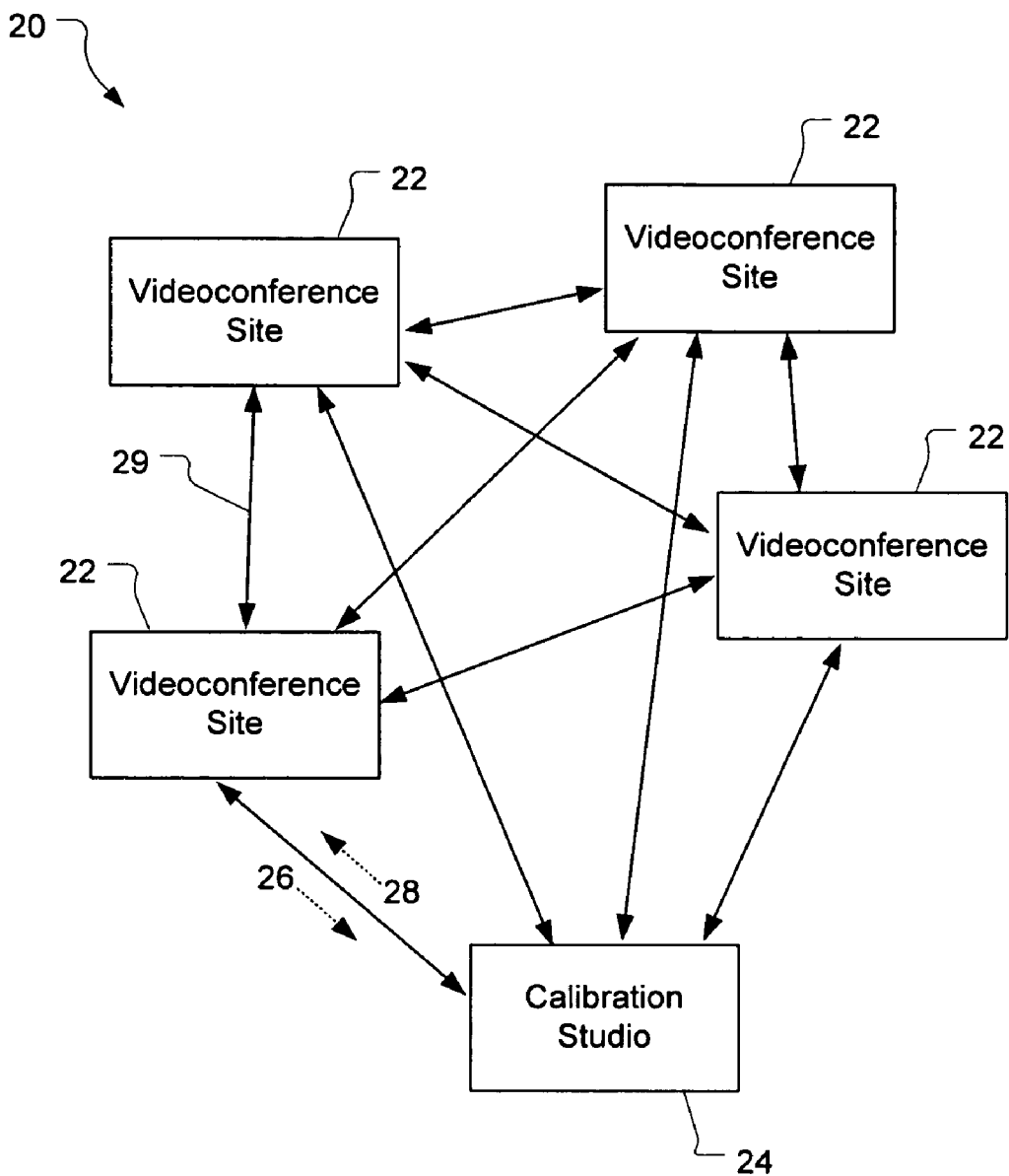
FIG. 2 is a block diagram of a multipoint videoconference system in accordance with an embodiment of the present invention.

FIG. 2 illustrates a multipoint videoconference system in accordance with an embodiment of the present invention. The videoconference system, shown generally at 20, includes a plurality of videoconference sites 22. The videoconference sites are capable of direct communication with at least one other videoconference site to exchange video images to form a multipoint videoconference. For example, two videoconference sites can be in communication with each other via videoconference links 29 to form a two-way videoconference. As another example, four sites can be in communication with each other to form a four-way videoconference. The videoconference sites will usually include at least one camera and at least one display, although the number of cameras and displays may vary from site to site. Various ways of providing the videoconference links can be used, including for example, wired and wireless transmission, such as via the Internet, private data networks, satellite transmission, and similar techniques.

Figure 3:
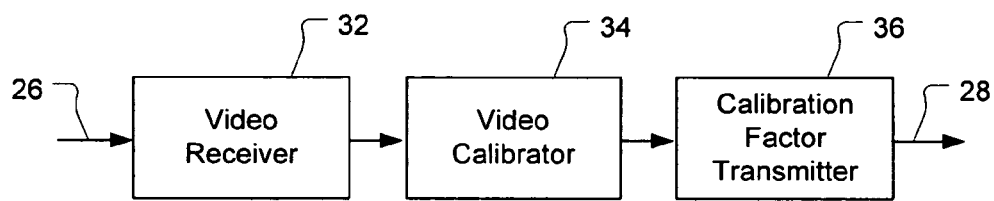
FIG. 3 is a detailed block diagram of a calibration studio in accordance with an embodiment of the present invention.

A calibration studio 24 can provide calibration for the videoconference sites to help provide a consistent video quality across the multipoint videoconference system. The calibration studio can include, as shown in further detail in FIG. 3, a video receiver 32, a video calibrator 34, and a calibration factor transmitter 36. The video receiver receives calibration data from the videoconference sites 22 (FIG. 2) via a first communications link 26. The video receiver may, for example, receive the calibration data as video images in an MPEG encoded format over an IP network from the videoconference studios. The received calibration data can be compared to a reference color scheme by the video calibrator to determine calibration correction factors. The calibration correction factors can be put into a format for use by the videoconference sites for application to video images transmitted between each other. For example, the calibration factors can define adjustments to a camera or to a display, such as white point, white level, black level, white/black balance, color correction, and the like. The calibration factors are transmitted from the calibration studio to the videoconference sites via a second communications link 28 by the calibration factor transmitter. The second communications link can use the same communications infrastructure as the first communication link, or can use a different communications infrastructure.

Figure 4:
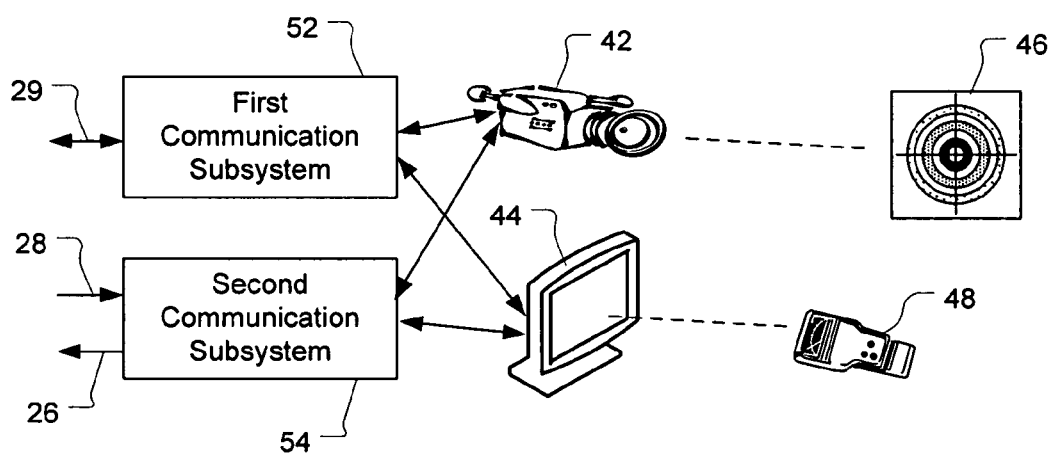
FIG. 4 is a detailed block diagram of a videoconference site in accordance with an embodiment of the present invention.

FIG. 4 illustrates in further detail a videoconference site from which the calibration process can be further understood. The videoconference site includes at least one video camera 42 and at least one video display 44. The video camera can be a color correctable camera which can accept calibration factors to adjust color of a transmitted video image. The videoconference site can be in communication with other videoconference sites via a first communications subsystem 52 to establish videoconference links 29. The videoconference site can also be in communication with a calibration studio, via a second communications subsystem 54 to establish a first communication link 26 and second communication link 28. The first communication link and second communication link can be provided by the same system, for example an IP network.

Calibration of the video camera 42 can include directing the video camera toward a video calibration target 46 to capture images of the video calibration target for transmission as calibration data to the calibration studio 24 (FIG. 2) for determining calibration correction factors. Positioning of the video camera and video calibration target can be performed manually, although it will be appreciated that increased efficiency can be obtained by remotely controlling the video camera from the calibration studio. For example, remote control commands to the video camera to control positioning, zoom, and similar parameters can be transmitted from the calibration studio using the second communications link 28.

The video display 44 can be a color correctable display which can accept calibration factors to adjust color of a displayed video image. Calibration of the video display can include directing a sensor 48 toward the video display to perform a measurement on the video display. For example, the sensor can be a colorimeter to measure color intensity levels of the display. The color intensity levels can be transmitted to the calibration studio 24 as calibration data for use in determining calibration correction factors. As another example, the sensor can be a video camera within the videoconference site. When using a video camera to provide for calibration of the video display, it is helpful to perform calibration of the video camera before calibration of the video display. This can help to ensure that the calibration of the video camera is decoupled from calibration of the video display. Other sensors, such as calorimeters, can be used within the videoconference site to help in setting absolute lighting and color levels and determining calibration data.

Calibration can also include setting an illumination level within the videoconference site. Setting the illumination level may include monitoring illumination using a sensor within the videoconference site, for example a sensor mounted within a table. Illumination levels may be controlled and monitored locally, or illumination levels may be controlled and monitored by the calibration studio.

The calibration studio 24 is remote from the videoconference sites 22 in that the calibration studio need not by physically collocated with a videoconference site. For example, a calibration studio located in the United States may be used to provide calibration for videoconference sites at various locations around the world. Multiple calibration studios can also be provided. As another example, one or more calibration studios can also be collocated with a videoconference sites.

A particularly detailed example of one video calibration approach will now be provided, although it should be appreciated that other techniques and calibration set points can also be used within embodiments of the present invention. In general, video calibration can be divided into calibration of the acquisition (e.g. cameras), transmission, and output (e.g. displays) portions of the system. Transmission can be in a digital format (e.g. MPEG-2 encoded video transmitted over an IP network), helping to avoid calibration of the transmission portion. Alternatively transmission can be in an analog format, or transmissions can use a combination of analog and digital formats. Since different acquisition systems may be in communication with different output systems, it is helpful to calibrate the acquisition and output portions separately using a common standard. It can be helpful to adjust lighting levels within the videoconference sites to a standard level. For example, lighting with a correlated color temperature of about 3500K can be adjusted to provide illumination of white paper on a table of about 75 cd/m$^2$ to provide a warm inviting environment within a videoconference site. Typically video cameras are, however, calibrated to operate at about 5600K, and displays at about 8500K, highlighting the desirability of performing calibration to achieve consistent video quality across the multipoint videoconference system.

As a specific example, calibration of a video display can be performed to adjust the white point to about 6500K. Black and white levels can be calibrated using an SMPTE color bar test pattern. This test pattern can be generated by video pattern generators and the like. Additional test patterns can be used to adjust white and black balance. Color normalization of the display may also be included if controls are available.

Calibration of video cameras can be performed using a neutral gray scale and color calibration reference. For example, black balance and black point can be adjusted for an NTSC camera. Following black level and balance adjustment, white level and grey scale balance can be performed. Color calibration can be developed by capturing a color matrix chip chart. A vector scope output of the camera can be observed and color matrix adjustments for the camera varied to match a predefined vector scope output.

Camera iris can be adjusted so that objects appear at the same intensity in each camera. For example, this can be performed by adjusting the luminance signal using a glossy white card so that all screens measure the same.

Returning to a general discussion of maintaining consistent video quality within a multipoint videoconference system, various aspects of the techniques described above can be performed by or controlled by software applications. The software application can execute on computer components within the calibration studio and videoconference sites, such as general purpose processors or specialized processors. Software may include computer readable instructions for performing or controlling various operations within the system.

For example, a computer readable medium can include computer readable instructions for capturing video calibration data from the plurality of videoconference sites. Capturing video calibration data can include interfacing with a video camera, encoding video images, measurements of displayed video images, adjusting video images, transmitting video images, examples as described above, and the like. The computer readable medium can also include computer readable instructions for determining calibration correction factors for the videoconference sites to achieve a consistent video appearance across the plurality of videoconference sites. For example, determining calibration correction factors can include comparing video calibration data to a calibration reference, determining camera correction factors, determining display correction factors, examples as described above, and the like. The computer readable medium can also include computer readable instructions for applying the calibration correction factors to the videoconference sites. For example, applying the calibration correction factors can include adjusting a video camera, adjusting a video display, examples as described above, and the like.

Various types of computer readable medium are known in the art which can be used. For example, the computer readable medium can be a floppy disk, compact disk (CD-ROM), digital versatile disk (DVD), flash memory (e.g., a flash drive or USB drive), read only memory, or a propagated signal (e.g. network communications using IP), or the like. New types of computer readable medium may be developed in the future and may be used.

Various measures can be included in the multipoint videoconference system 20 to help avoid interference between an ongoing videoconference and calibration activities. For example, software applications may include access control measures to limit which applications can control or affect device settings. Interlocks can be included to help prevent calibration activities, such as camera movement or calibration target extension, from disrupting an ongoing videoconference.

Finally, a method of making a multipoint videoconference system having consistent video quality will be described. The method can include deploying at least one suite of videoconferencing equipment to at least one videoconference site. The suite of videoconferencing equipment can include means for communication with at least one other videoconference site to exchange video images to form a multipoint videoconference system. For example, the means for communication may include video cameras 42, video displays 44, and a first communication subsystem 52 as described above. The videoconferencing equipment can also include a means for communication with a calibration studio. The communication means may provide for transmitting calibration data to the calibration studio and receiving calibration factors from the calibration studio. For example, the means for communication may include a second communication subsystem 54 as described above. The videoconferencing equipment can also include a means for applying the calibration factors to video images exchanged with other videoconferences sites. The calibration factors may be determined to help achieve a consistent video appearance across the plurality of videoconference sites. The means for applying the calibration factors may include color correctable cameras, color correctable displays, other adjustable video processing devices, and the like as described above.

Because display and camera characteristics can vary over time, it can be helpful to periodically adjust the calibration factors for each video site based on recently received calibration data. For example, an initial calibration may be performed to determine an initial set of calibration factors for each videoconference site, and then calibration periodically adjusted based on more recently acquired calibration data.

Summarizing and reiterating to some extent, a technique for maintaining consistent video quality between a plurality of videoconference sites has been invented. In an embodiment, the technique includes calibrating acquisition portions (e.g., cameras) and output portions (e.g., displays) of a multipoint videoconference system to common standards. This helps to ensure consistent image quality (e.g., color, intensity levels, image framing, and the like) across different pairings of individual videoconference sites. Calibration can be performed using a calibration studio which communicates with the individual videoconference sites. Calibration data can be sent from a videoconference site to the calibration studio and vice versa. Differences between calibration standards and test calibration video images can be measured and adjustments for equipment at the videoconference sites determined. The adjustments can be communicated from the calibration studio to the videoconference sites for application to subsequent video transmissions between sites. Application of adjustments may be manual, or may be automatic under control of the calibration studio. Periodic updating of calibration can be performed to help maintain consistent video quality over time.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method of maintaining consistent video quality between a plurality of videoconference sites in direct communication with each other in a multipoint videoconference system comprising:
   a) capturing video calibration data from the plurality of videoconference sites;
   b) transmitting the video calibration data to a remote calibration studio;
   c) determining calibration correction factors for the videoconference sites to achieve a consistent video appearance across the plurality of videoconference sites;
   d) communicating the calibration correction factors from the remote calibration studio to the videoconference sites; and
   e) applying the calibration correction factors to video transmission between the plurality of videoconference sites.

2. The method of claim 1, wherein capturing video calibration data comprises imaging a video calibration target.

3. The method of claim 1, wherein capturing video calibration data comprises:
   transmitting a video color calibration image from the calibration studio to the display within the videoconference site; and
   capturing an image of a display within a videoconference site using a sensor collocated within the videoconference site.

4. The method of claim 1, wherein capturing video calibration data comprises measuring light intensity level.

5. The method of claim 1, wherein applying the calibration correction factors comprises adjusting camera color settings to normalize transmitted color to a reference color scheme.

6. The method of claim 1, wherein applying the calibration correction factors comprises adjusting display color settings to normalize displayed color to a reference color scheme.

7. The method of claim 1, wherein applying the calibration correction factors comprises adjusting settings of a video processing device.

8. The method of claim 1, wherein applying the calibration correction factors comprises adjusting the view of the camera.

9. A multipoint videoconference system providing consistent video quality across multiple videoconference sites comprising:
   a) a plurality of videoconference sites each being capable of direct communication with at least one other videoconference site to exchange video images to form a multipoint videoconference; and
   b) a calibration studio in communication with the plurality of videoconference sites, the calibration studio having:
      i) a video receiver to receive calibration data from the plurality of videoconference sites,
      ii) a video calibrator to determine calibration correction factors for the videoconference sites to achieve a consistent video appearance across the plurality of videoconference sites, and
      iii) a calibration factor transmitter to transmit calibration factors to the videoconference sites, wherein the videoconference sites can apply the calibration factors to exchanged video images to achieve consistent video quality across the multipoint videoconference.

10. The system of claim 9, wherein the video calibrator determines calibration correlation factors relative to a reference color scheme.

11. The system of claim 9, wherein the videoconference sites comprise a color correctable camera configured to accept calibration factors to adjust color of a transmitted video image.

12. The system of claim 9, wherein the videoconference sites comprise a color correctable display configured to accept calibration factors to adjust color of a displayed video image.

13. The system of claim 9, wherein a videoconference site comprises:
   a video calibration target; and
   at least one video sensor directable towards the video calibration target to transmit calibration data to the calibration studio.

14. A method of making a multipoint videoconference system having consistent video quality comprising:
   a) deploying at least one suite of videoconferencing equipment to at least one videoconference site, the suite of videoconferencing equipment having:

i) means for communication with at least one other videoconference site to exchange video images to form a multipoint videoconference;

ii) means for communication with a calibration studio to transmit calibration data to the calibration studio and receive calibration factors from the calibration studio; and iii) means for applying the calibration factors to video images exchanged with other videoconference sites to achieve a consistent video appearance across the plurality of videoconference sites.

15. The method of claim 14, further comprising performing an initial calibration of the multipoint videoconference system using the calibration studio to define calibration factors for each video site.

16. The method of claim 14, further comprising periodically adjusting the calibration factors for each video site based on recently acquired calibration data.

17. A non-transitory computer readable medium having computer readable instructions embodied thereon for maintaining consistent video quality between a plurality of videoconference sites in direct communication with each other in a multipoint videoconference system comprising:

a) computer readable instructions for capturing video calibration data from the plurality of videoconference sites;

b) computer readable instructions for determining calibration correction factors for the videoconference sites to achieve a consistent video appearance across the plurality of videoconference sites; and c) computer readable instructions for applying the calibration correction factors to the videoconference sites.

18. A calibration studio for maintaining consistent video quality between a plurality of videoconference sites in direct communication with each other in a multipoint videoconference system comprising:

a) a video receiver to receive calibration data from the plurality of videoconference sites, b) a video calibrator to determine calibration correction factors for the videoconference sites to achieve a consistent video appearance across the plurality of videoconference sites, and c) a calibration factor transmitter to transmit calibration factors to the videoconference sites in a format suitable for use by the videoconference sites for application to video images exchanged between each other.

* * * * *